United States Patent [19]

Stanton

[11] Patent Number: 4,855,855
[45] Date of Patent: Aug. 8, 1989

[54] TAPE RECORDER HEAD CLEANER

[76] Inventor: Peter R. Stanton, 48 Prince Alfred Parade, Newport, New South Wales, Australia 2106

[21] Appl. No.: 58,661

[22] Filed: May 22, 1987

Related U.S. Application Data

[63] Continuation of Ser. No. 569,212, Jan. 9, 1984, abandoned.

[30] Foreign Application Priority Data

Jan. 17, 1983 [AU] Australia .................... PF7635

[51] Int. Cl.$^4$ ............................. G11B 5/41
[52] U.S. Cl. .................... 360/128; 360/137; 15/210 R
[58] Field of Search ........... 360/128, 132, 137; 15/210 R; 274/47

[56] References Cited

U.S. PATENT DOCUMENTS

| | | |
|---|---|---|
| 3,761,994 | 10/1973 | Becht .................... 360/128 X |
| 3,955,214 | 5/1976 | Post et al. .................... 360/137 X |
| 4,225,893 | 9/1980 | Loiselle .................... 360/137 X |
| 4,272,796 | 6/1981 | Van Kreuningen et al. ....... 360/128 |
| 4,442,468 | 4/1984 | d'Alayer de Costemore d'Arc .................... 360/128 |
| 4,445,158 | 4/1984 | Clausen et al. .................... 360/128 X |
| 4,458,281 | 7/1984 | Kara .................... 15/210 R X |

FOREIGN PATENT DOCUMENTS 0100254 6/1983 Japan .................... 360/128

Primary Examiner—Robert S. Tupper
Assistant Examiner—Andrew L. Sniezek
Attorney, Agent, or Firm—Albert L. Jeffers; Anthony Niewyk

[57] ABSTRACT

A cleaning device for a cassette-type tape recorder wherein a cassette shell is provided with a longitudinally reciprocating bar adjacent the edge of the shell normally aligned with the heads of the recorder in use, the reciprocating bar being provided with a number of cleaning pads which contact and clean the heads and drive rollers in the tape recorder in a reciprocating manner. In the preferred form of the invention three cleaning pads are provided to clean the erase head, the record/playback head, and the capstan and pinch roller respectively.

The bar is reciprocated by a cam drive from a hub member rotated by a drive spindle in the tape recorder. In the preferred form of the invention two hub members are provided, one being engaged with the forward take-up spindle and the other with the reverse take-up spindle of the tape recorder so that the cleaning device can operate either way up or in conjunction with an auto-reverse tape recorder regardless of the playing direction engaged.

7 Claims, 2 Drawing Sheets

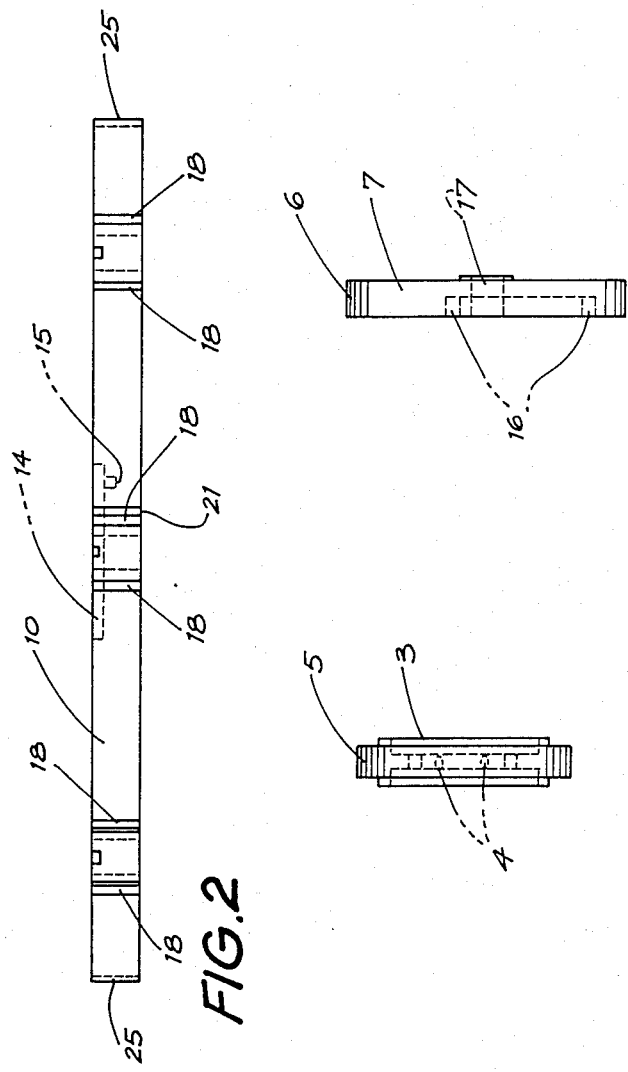

TAPE RECORDER HEAD CLEANER

This is a continuation of application Ser. No. 569,212, filed Jan. 9, 1984, now abandoned.

This invention relates to a tape recorder cleaner and has been devised particularly though not solely for use with cassette type tape recorders wherein magnetic tape held in a cassette passes over components of the tape recorder such as record, playback, and erase heads and drive capstans and pinch rollers, wherein these components periodically require cleaning to remove oxide deposits.

BACKGROUND OF THE INVENTION

Various proposals have been made in the past to provide apparatus for cleaning the heads and rollers in a cassette type tape recorder, and the commonest commercially available unit is one in which a cassette-like device is provided with a special cleaning tape in the place of the normal magnetic tape. The cleaning tape is moved by the normal tape transport arrangement to pass over the heads, capstan and pinch roller of the tape recorder in an attempt to provide a cleaning action. It has been found that this cleaning action is far from satisfactory as there is a tendency to smear the oxide deposits rather than clean them off the components, the tape has an abrasive characteristic which is detrimental to the heads of the recorder, and the tape is prone to break frequently in use.

In an attempt to deal with these disadvantages proposals have been published wherein a cassette shell is provided with a cleaning pad mounted on an oscillatory lever driven by a cam contained within the cassette-type shell and arranged to be driven by the take-up spindle of the machine so that the pad on the end of the lever is wiped back and forth over the record/playback head. U.S. Pat. Nos. 3,955,214, 4,149,206, 4,225,893, and 4,272,796 are examples of tape head cleaners using oscillatory motion in a lever system. U.S. Pat. No. 4,141,053 discloses a rotating head cleaner also adapted to clean the record/playback head of the tape recorder. The apparatus described in these U.S. patent specifications are concerned with the mounting of a single pad for oscillatory motion to clean solely the record/playback head of the tape recorder, and some of these devices are also provided with a fixed pad for cleaning the pinch roller and capstan of the tape recorder. It is considered that the cleaning function provided by these prior art arrangements is far from ideal insofar as the cleaning of the pinch roller and capstan is concerned, and furthermore these devices make no provision for cleaning the erase head of the tape recorder.

SUMMARY OF THE INVENTION

It is therefore an object of the present invention to provide apparatus for cleaning a plurality of components in a cassette-type tape recorder which will obviate or minimise the foregoing disadvantages in a simple yet effective manner or which will at least provide the public with a useful choice.

Accordingly the invention consists in apparatus for cleaning a plurality of components in a cassette-type tape recorder which are contacted by magnetic tape in use of the recorder, said apparatus comprising a base element adapted to be inserted into the recorder in the same manner as a tape cassette, at least one hub member rotatably mounted on the base element and arranged to engage and be rotated by a drive spindle in said recorder, a mounting structure slidably mounted in guides associated with the base element and positioned for reciprocal motion substantially parallel to the path of magnetic tape across the heads of the recorder, drive means between the or each hub member and the mounting structure arranged to reciprocate the mounting structure in said reciprocal motion upon rotation of the hub member, and a plurality of cleaning pads mounted on said mounting structure and arranged so that each said pad reciprocates over the surface of at least one said component when said mounting structure is reciprocated by said drive means.

Preferably the drive means comprises cam means rotated by the hub member, and a cam follower mounted on or connected to the mounting structure.

Preferably the cam means comprises a cam wheel rotated by the hub member and incorporating a cam track enaged by said cam follower.

Preferably the mounting structure is formed as a resiliently flexible plastic moulding of strip-like form and preferably the guides comprise pins depending from the base element.

In a preferred embodiment the cam follower comprises an arm connected to the mounting structure and is arranged so that the cam follower and the cam means co-operate in a positive interengagement, thereby obviating the need for resilient biassing means for biassing the cam follower into engagement with the cam. This can be achieved by providing the cam means in the form of a cam track, and preferably a recessed slot or groove in a cam wheel, and the cam follower in the form of a peg which engages in the slotted cam track.

Preferably the embodiments of the invention provide for the mounting structure to mount cleaning pads for the erase head, the record/playback head, and the capstan/pinch roller of a cassette-type tape recorder. By forming the mounting structure in an elongated strip-like form this arrangement can effectively be provided and the cleaning heads can readily be saturated with solvent through one open edge of the base element if this is desired.

DESCRIPTION OF THE DRAWINGS

Notwithstanding any other forms that may fall within its scope, one preferred form of the invention will now be described by way of example only with reference to the accompanying drawings, in which:

FIG. 2 is a frontal view of the mounting structure used in the cleaner shown in FIG. 1;

FIG. 3 is an edge view of the hub member used in the cleaner; and

FIG. 4 is an edge view of the cam wheel used in the cleaner.

DESCRIPTION OF THE PREFERRED EMBODIMENT

Figure 1:
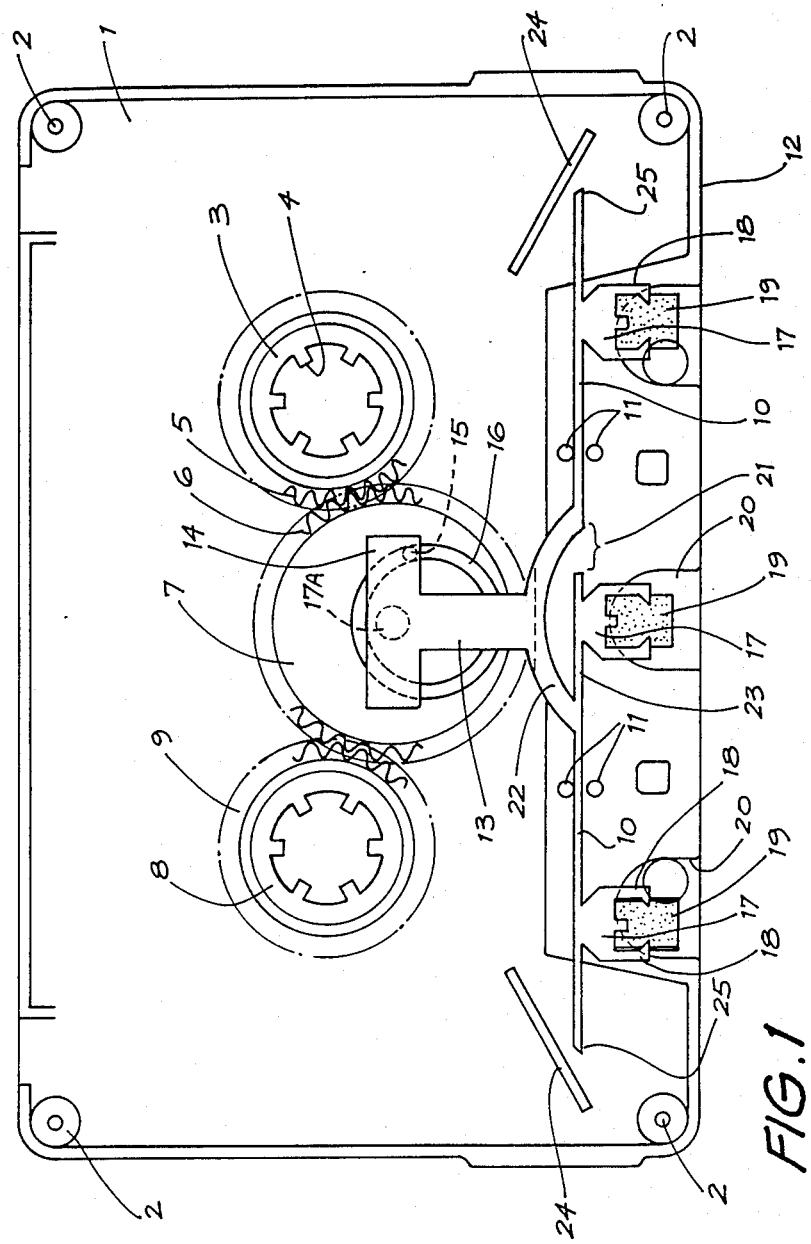
FIG. 1 is a plan view of a tape recorder cleaner according to the invention, with the top cover of the base element removed for clarity.

In the preferred form of the invention a cleaner for the heads and drive capstan of a cassette-type audio tape recorder is constructed as follows, although it will be appreciated that the construction may be modified for use with other types of recorders.

The cleaner comprises a base element 1 which is fabricated by moulding from a suitable plastics material to the same overall configuration as a magnetic tape cassette so that the base element may be readily inserted into a cassette type tape recorder in the same manner as a normal recording cassette. The base element is typically moulded in two halves in a similar manner to a magnetic tape cassette, there being a bottom half shell as shown in FIG. 1 and a cover half (not shown) held together by screws in moulded bosses 2 at the corners of the base element.

The cleaner is provided with at least one hub member 3 which is provided with internal teeth 4 adapted to engage with and be rotated by the drive spindle in the tape recorder. The hub member is rotatably mounted in the base element in a similar manner to the mounting of the hubs in a conventional recording cassette. The outer periphery of the hub member is formed to the configuration of a toothed gear pinion having drive teeth 5 which mesh with similar teeth 6 on a cam wheel 7 which is also rotatably mounted on the base element and is rotatably driven by the hub member. In the preferred form of the invention a second hub member 8 is provided of similar configuration to the hub member 4 and also incorporating pinion teeth 9 which mesh with the teeth 6 on the cam wheel 7. The second hub member is positioned so as to be engaged with the rewind spindle of the tape recorder and is provided primarily to facilitate use of the cleaner in tape recorders with an automatic reverse function. By the provision of the second hub member 8 the cam wheel 7 is rotated by the drive mechanism of the recorder regardless of whether the recorder is operating in the normal forward play, or in the reverse play mode.

The cleaner is further provided with a mounting structure in the form of a strip-like mounting bar 10 which is slidably mounted in a guide pins 11 protruding from the base element 1 and positioned for reciprocal motion parallel to the path of magnetic tape across the heads of the recorder when the cleaner is engaged with the recorder. To this end the magnetic tape of a cassette would normally move along a path parallel with the front edge 12 of the base element and therefore the mounting bar is arranged to slidably reciprocate parallel to that front edge.

The mounting bar is provided with an off-set arm 13 which protrudes rearwardly above the cam wheel 7 and which is provided with a T-shaped head 14 on which is mounted a downwardly depending peg 15. The peg 15 engages in a cam track 16 in the form of a slot in the upper surface of the cam wheel so that the peg is constrained to follow the cam track upon rotation of the cam wheel. In the preferred form of the invention the cam wheel rotates about a central pivot 17A and the cam track comprises a circular track off-set with regard to the pivot 17A as shown in FIG. 1. Rotation of the cam wheel by one of the hub members 3 or 8 therefore causes the cam track to rotate in an eccentric manner causing the peg 15 and hence the arm 13 and the mounting bar 10 to reciprocate from side to side restrained by the guide pins 11.

It is a feature of the drive means that there is a positive engagement of the cam follower (in the form of the peg 15) with the cam surface (in the form of the slot 16) so that there is no need to provide a biassing spring to retain the cam follower in contact with the cam surface.

The mounting bar 10 is provided with a plurality of cleaning pad holders 17 spaced along the front surface of the mounting bar and which would normally be moulded from a plastics material integrally with the mounting bar 10. The holders are spaced along the mounting bar at positions corresponding to the normal location of the erase head, the record/playback head, and the drive capstan and pinch roller of a conventional cassette type tape recorder. Each holder is conveniently provided with a U-shaped recess having re-entrant arms 18 at the outer ends to locate and hold a cleaning pad 19. For convenience the lower shell of the base element 1 may be provided with recessed portions 20 in locations below the cleaning pads 19 so that the pads may be conveniently slid downwardly from the holders through the recesses 20 when it is desired to replace the cleaning pads.

The cleaning pads 19 are provided of a convenient felt-like material suitable for use in cleaning the heads and rollers of a tape recorder in a non-abrasive manner. In use the pads may be moistened by a suitable solvent if desired.

The mounting bar 10 is preferably moulded from a resilient plastics material such as an acetal material so as to flex in use and provide a resilient bias of the cleaning pads forwardly against the heads or rollers respectively. To this end the mounting bar is preferably discontinued at location 21 and the two sections joined by an integrally mounted arch 22 upon which the arm 13 is mounted. In this manner the central cleaning pad is supported on a short cantilevered section 23 of the mounting bar so that it may be resiliently biassed rearwardly in the base element.

It is also preferred to provide inclined ramps 24 located toward either end of the mounting bar and taking the form of flanges extending upwardly from the base element 1. The ramps 24 are contacted by the ends 25 of the mounting bar toward the limits of the travel of the mounting bar so that the ends are biassed forwardly at the limits of their travel providing support for the adjacent cleaning pad and also causing the pad to move forwardly and incline slightly to clean around the head or capstan roller.

Although, in the preferred form of the invention, the biassing force on each cleaning pad toward its respective component to be cleaned is provided by the flexibly resilient nature of the mounting bar, this biassing force may of course be provided in other ways. By way of example only, the mounting structure may be rigid and the cleaning pad holders 17 may be resilient so as to bias the pads forwardly toward the edge 12. Alternatively the biassing means may be by way of small springs between each pad and its respective holder.

In this manner a cleaner for a cassette-type tape recorder is provided which has a plurality of cleaning pads 19 which may be positioned so that each pad is adapted to reciprocate in use over the surface of at least one component in the recorder. As described in the preferred embodiment, the left hand pad shown in FIG. 1 reciprocates over the surface of the erase head of the recorder, the central pad over the record/playback head, and the right hand pad over the capstan and pinch roller. In this manner all of the operative surfaces of the cassette recorder which are contacted by the magnetic tape may be cleaned simply and efficiently by a reciprocating type motion which has been found to be effective in use. it is a further feature of the invention that because of the dual drive hubs 4 and 8, the cleaner may be inserted into the recorder either way up, and furthermore may be used with a reversible type recorder regardless of the mode in which the recorder is set.

What is claimed is:

1. Apparatus for cleaning a plurality of components in a cassette type tape recorder and wherein the components, including a plurality of heads, are contacted by a magnetic tape in use of the recorder, said apparatus comprising:
- a cassette shaped base element adapted to be inserted into a recorder;
- a hub member rotatably mounted on the base element and adapted to engage with and be rotated by a recorder drive spindle;
- a cam rotated by the hub member;
- an elongate mounting bar slidably mounted in guides associated with the base element for reciprocal motion substantially parallel to the path of a magnetic tape across the heads of a recorder;
- an arm formed in one unitary rigid piece with the mounting bar and cantilevered transversely thereto, said arm incorporating a cam follower engaged with the cam such that rotation of the cam causes the mounting bar and arm to reciprocate in unison and said bar to move solely axially in said guides; and
- a plurality of cleaning pads mounted on said mounting bar so that, when said mounting bar is axially reciprocated by said arm, each said pad reciprocates for cleaning a surface of at least one component of a recorder.

2. Apparatus as claimed in claim 1 wherein said cam comprises a cam wheel incorporating a cam track, and said cam follower comprises a pin engaged in said cam track.

3. Apparatus as claimed in claim 2 wherein the cam track comprises a circular track having its center offset from the center of the cam wheel.

4. Apparatus as claimed in claim 2 wherein the cam wheel is separate from the hub member and wherein the cam wheel and the hub member are each provided with teeth on their peripheries, the teeth of the cam wheel and the hub member meshing whereby the hub member provides a geared drive for the cam wheel.

5. Apparatus as claimed in claim 1 wherein said mounting bar is resiliently flexible and includes a plurality of cantilevered portions, each said cantilevered portion having a said cleaning pad mounted thereon, each said cantilevered portion extending generally parallel to said bar and being resilient whereby, upon insertion of the apparatus into a tape recorder and deflection thereby of each said cantilevered portion relative to said mounting bar, a resilient biasing force is provided on each said cleaning pad thereby urging each said pad toward the recorder components over which the respective pads are adapted to reciprocate.

6. Apparatus as claimed in claim 5 wherein three said cleaning pads are provided at spaced locations along said bar, and wherein said resilient bar is discontinuous adjacent the central one of said three cleaning pads whereby said bar is comprised of at least first and second sections, said first and second sections of the bar being connected by a bridge extending from an end point on said first section to a point intermediate the central pad and a first end of said second section of the bar, said central cleaning pad being supported on a cantilevered portion of the bar which extends from a second end point on said second section.

7. An apparatus for cleaning a plurality of components in a cassette type tape recorder and wherein the components, including a plurality of heads, are contacted by a magnetic tape in use of the recorder, said apparatus comprising:
- a cassette shaped base element adapted to be inserted into a recorder;
- a hub member rotatably mounted on the base element and adapted to engage with and be rotated by a recorder drive spindle;
- a cam rotated by the hub member;
- an elongate mounting bar slideably mounted in guides associated with the base element for reciprocal motion substantially parallel to the path of a magnetic tape across the heads of a recorder, said mounting bar being resiliently flexible and including a plurality of cantilevered portions;
- an arm integral with and rigidly secured to the mounting bar and cantilevered transversely thereto, said arm incorporating a cam follower engaged with the cam such that rotation of the cam causes the mounting bar and arm to reciprocate in unison and said bar to move axially in said guides;
- a plurality of cleaning pads mounted on respective ones of said plurality of cantilevered portions of said mounting bar, each said cantilevered portion extending generally parallel to said bar and being resilient whereby, upon insertion of the apparatus into a tape recorder and deflection thereby of each cantilevered portion relative to the mounting bar, a resilient bias force is provided on each said cleaning pad, thereby urging each said cleaning pad toward the recorder components over which the respective pads are adapted to reciprocate, each said pad reciprocating in unison with said bar for cleaning a surface of at least one component of a recorder; and
- inclined ramps provided on said base element adjacent outer ends of the mounting bar, said ramps arranged so that the said outer ends of said mounting bar contact the ramps toward the extremes of reciprocal motion of the mounting bar and are thereby biased toward the recorder components to increase the biasing force of the adjacent cleaning pad on the corresponding component being cleaned.

* * * * *